(12) United States Patent
Halimi et al.

(10) Patent No.: US 6,256,993 B1
(45) Date of Patent: Jul. 10, 2001

(54) MOTOR-ASSISTED VARIABLE GEOMETRY TURBOCHARGING SYSTEM

(75) Inventors: Edward M. Halimi, Montecito; Ralph P. Maloof, Calabasas; William E. Woollenweber, Carlsbad, all of CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/386,584

(22) Filed: Aug. 31, 1999

Related U.S. Application Data

(60) Division of application No. 08/811,474, filed on Mar. 4, 1997, now abandoned, which is a continuation-in-part of application No. 08/714,618, filed on Sep. 16, 1996, now abandoned, which is a continuation of application No. 08/508,442, filed on Jul. 28, 1995, now Pat. No. 5,560,208.

(51) Int. Cl.$^7$ ..................................................... F02B 37/10
(52) U.S. Cl. .................. 60/608; 60/600; 60/611
(58) Field of Search ............................. 60/600, 602, 608, 60/611

(56) References Cited

U.S. PATENT DOCUMENTS

| | | |
|---|---|---|
| 2,078,499 | 4/1937 | Ljungstrom . |
| 2,173,489 | 9/1939 | Voigt . |
| 2,578,785 | 12/1951 | Davis . |
| 2,649,048 | 8/1953 | Pezzillo et al. . |
| 2,782,721 | 2/1957 | White . |
| 2,829,286 | 4/1958 | Britz . |
| 3,163,790 | 12/1964 | White . |
| 3,557,549 | 1/1971 | Webster . |
| 3,572,982 | 3/1971 | Kozdon . |
| 3,961,199 | 6/1976 | Bronicki . |
| 4,253,031 | 2/1981 | Frister . |
| 4,445,337 | 5/1984 | McCreary ............................. 60/608 |

(List continued on next page.)

FOREIGN PATENT DOCUMENTS

| | | |
|---|---|---|
| 294985 | 12/1988 | (EP) . |
| 312107 | 4/1989 | (EP) . |
| 367406 | 9/1990 | (EP) . |
| 2479899 | 9/1981 | (FR) . |
| 267149 | 8/1927 | (GB) . |
| 308585 | 3/1929 | (GB) . |
| 57-212331 | 12/1982 | (JP) . |
| 58-222919 | 12/1983 | (JP) . |
| 59-49323 | 3/1984 | (JP) . |
| 3202633 | 4/1991 | (JP) . |
| 4-112921 | 4/1992 | (JP) . |
| 5-5419 | 1/1993 | (JP) . |

OTHER PUBLICATIONS

SAE Technical Paper 940842 "Turbo–Compound Cooling Systems for Heavy–Duty Diesel Engines", 1994, W.E. Woollenweber.

Proc. Instn. Mech Engrs. vol. 189, 43/75, "Experimental and Theoretical Performance of a Radial Flow Turbochargr Compressor with Inlet Prewhirl", 1975, pp. 177–186, F.J. Wallace, et al.

*Primary Examiner*—Michael Koczo
(74) *Attorney, Agent, or Firm*—Brinks Hofer Gilson & Lione

(57) ABSTRACT

The motor-assisted variable geometry turbocharging system has a motor to add power to the turbocharger rotating assembly, especially at low exhaust gas volume. Additionally, the system includes a control over compressor air inlet direction, and/or control of exhaust gas to a two-volute expander. These are individually controlled, or controlled in combination, to enhance turbocharged engine performance. In a preferred embodiment, the system comprises an electric motor, mounted directly within the turbocharger main housing, variable pre-whirl vanes mounted upstream of the turbocharger compressor, and a diverter valve in the exhaust piping upstream of a divided turbine volute.

9 Claims, 4 Drawing Sheets

U.S. PATENT DOCUMENTS

| | | |
|---|---|---|
| 4,453,381 | 6/1984 | Dinger .................................. 60/612 |
| 4,565,505 | 1/1986 | Woollenweber ..................... 417/407 |
| 4,641,977 | 2/1987 | Woollenweber . |
| 4,708,095 | 11/1987 | Luterek . |
| 4,708,602 | 11/1987 | McEachern, Jr. et al. .......... 417/407 |
| 4,776,168 | 10/1988 | Wollenweber et al. ................ 60/602 |
| 4,827,170 | 5/1989 | Kawamura et al. . |
| 4,850,193 | 7/1989 | Kawamura ............................ 60/608 |
| 4,878,347 | 11/1989 | Kawamura ............................ 60/608 |
| 4,882,905 | 11/1989 | Kawamura ............................ 60/608 |
| 4,885,911 | 12/1989 | Woollenweber et al. ............. 60/597 |
| 4,894,991 | 1/1990 | Kawamura ............................ 60/608 |
| 4,901,530 | 2/1990 | Kawamura ............................ 60/608 |
| 4,918,923 | 4/1990 | Woollenweber et al. ............. 60/614 |
| 4,935,656 | 6/1990 | Kawamura . |
| 4,955,199 | 9/1990 | Kawamura ............................ 60/608 |
| 4,958,497 | 9/1990 | Kawamura ............................ 60/608 |
| 4,958,708 | 9/1990 | Kawamura . |
| 4,981,017 | 1/1991 | Hara et al. ............................ 60/608 |
| 4,998,951 | 3/1991 | Kawamura ............................ 60/608 |
| 5,025,629 | 6/1991 | Woollenweber ...................... 60/600 |
| 5,038,566 | 8/1991 | Hara ...................................... 60/608 |
| 5,074,115 | 12/1991 | Kawamura ............................ 60/608 |
| 5,088,286 | 2/1992 | Muraji ................................... 60/608 |
| 5,094,587 | 3/1992 | Woollenweber . |
| 5,121,605 | 6/1992 | Oda et al. ............................. 60/608 |
| 5,176,509 | 1/1993 | Schmider et al. . |
| 5,406,797 | 4/1995 | Kawamura ............................ 60/608 |
| 5,560,208 | 10/1996 | Halimi et al. ......................... 60/608 |
| 5,577,385 | 11/1996 | Kapich .................................. 60/612 |
| 5,605,045 | 2/1997 | Halimi et al. ......................... 60/607 |

MOTOR-ASSISTED VARIABLE GEOMETRY TURBOCHARGING SYSTEM

This is a division of U.S. patent application Ser. No. 08/811,474 filed Mar. 4, 1997, abandoned, which is a continuation in part of U.S. patent application Ser. No. 08/714,618 filed Sep. 16, 1996, abandoned, which is a continuation of U.S. patent application Ser. No. 08/508,442 filed Jul. 28, 1995, now U.S. Pat. No. 5,560,208.

FIELD OF THE INVENTION

The present invention relates generally to variable geometry components used in turbochargers applied to internal combustion engines that operate over a broad range of speed and load.

BACKGROUND OF THE INVENTION

Fixed geometry turbochargers can be designed to operate efficiently at a particular engine load and speed. However, when operated over a broad range of engine speed and load, the compressor and turbine components are forced to function off their design points and, consequently, suffer losses in efficiency that affects engine performance adversely. If the turbocharger is matched to an engine at the engine's rated speed, it will run considerably off its maximum efficiency when the engine is "torqued down" to low engine operating speeds. Conversely, if the turbocharger is matched to an engine's low speed range, the turbocharger will have a tendency to "overspeed" when the engine is operated at maximum speed and load.

To prevent overspeeding in turbochargers that have been matched to the low engine speed range, a waste gate is frequently used to bypass exhaust gas around the turbine to limit turbine speed over the high engine speed range. The waste gate, however, allows the escape of exhaust gas energy, which could be better utilized by the turbocharger turbine, and results in a substantial loss in system efficiency.

A more efficient system generally known in the trade is one comprising variable geometry components in the turbocharger compressor, the turbocharger turbine, or both. The most common types are variable nozzle vanes ahead of the turbine wheel, and/or variable diffuser vanes in the compressor component.

Variable nozzle vanes ahead of the turbine wheel are connected together so that the throat area of each nozzle passage can be reduced over the low engine speed range and increased as the engine speed approaches its maximum, so that the turbocharger speed is kept within a safe operating range. The positioning of the vanes must be precisely controlled by engine speed and load, and they must be freely movable in the hot exhaust gas environment with minimal leakage through clearance spaces.

The various movable devices that have been employed in the turbocharger turbine have been complicated, expensive and subject to questionable durability. Consequently, they have met with limited commercial success.

A more practical approach to a variable device in the engine exhaust system was disclosed in U.S. Pat. No. 3,557,549 to Webster, assigned to Caterpillar Tractor Co., 1971. This system employs a flapper valve so positioned in a divided manifold system that it resides in a neutral position at high engine speed and load, but can be moved to a second position where it diverts all engine exhaust gas flow into one passage of a divided turbine casing at low engine speeds. This essentially doubles the flow of exhaust gas through the single turbine casing passage and maintains the turbocharger speed at higher levels than otherwise could be reached at low engine speeds. This device is much simpler than the complicated variable nozzle vane systems and does not require a precise control system for positioning.

The use of the flapper valve to divert exhaust gas allows the turbocharger to be matched efficiently to the higher engine speeds where the flapper is in a neutral position. When the engine is operated at low engine speeds, the diversion of full exhaust flow of the single turbine casing passage ahead of the turbine increases the turbocharger rotor speed to provide higher boost pressure to the engine cylinders, allowing the engine to produce more power and torque than otherwise could be obtained.

The increase in boost at low engine speeds produced by the diverted flapper valve might be great enough to cause the turbocharger compressor to operate in its surge or unstable area. In this case, the compressor must be rematched to move its surge line to lower airflow so that the engine operating points fall within its stable operating regime. However, this causes a movement of the compressor efficiency islands and choke area to lower flow and can result in lowering the compressor efficiency when the engine is operating at high speed and load.

A variable geometry compressor that can shift the performance map of the compressor to a lower or higher flow range is one solution to the problem of keeping the compressor out of surge at low engine speeds and still maintain high efficiency at high engine speeds. Variable diffuser vanes is one type of variable geometry compressor that could be employed, but the movable vanes cause significant mechanical complication internally in the construction of the turbocharger and must be precisely positioned by a rather elaborate control system.

A more practical type of variable geometry device is to employ movable pre-whirl vanes upstream of the compressor wheel to provide positive and negative pre-whirl to the air entering the inducer of the compressor wheel. Negative pre-whirl moves the compressor operating range to higher flow and usually improves compressor efficiency. Positive pre-whirl moves the compressor operating range to lower flow and usually lowers compressor efficiency somewhat. However, since the maximum island of compressor efficiency is also moved to lower flow, the net effect of positive pre-whirl is to raise the level of efficiency available to the operating area of the engine.

It is thus advantageous to connect the movable flapper valve in the exhaust stream to the movable pre-whirl vanes in the airstream by a mechanical linkage, causing them to move in synchronization. With the flapper in neutral, the pre-whirl vanes are positioned to provide negative pre-whirl to the compressor, moving its flow range, so that the maximum efficiency is available in the high engine speed range. When the flapper is in the diverted position, the pre-whirl vanes are moved to the positive pre-whirl position, thereby moving the maximum compressor efficiency to the low engine range. A simple, hydraulic cylinder or solenoid can be employed as an actuating means to move the mechanical linkage to either the high flow or low flow position by sensing the engine speed at which the transition is required to be made.

Both the flapper valve and the pre-whirl vanes are external from the turbocharger construction, resulting in much lower overall cost than other variable geometry devices that must be built into the internal construction of the turbocharger.

The movement of the compressor flow range by utilizing positive and negative pre-whirl is more fully described in a paper published in the *Proceedings of the Institute of Mechanical Engineers,* Vol. 18943/75, entitled "Experimental and Theoretical Performance of Radial Flow Turbocharger Compressor with Inlet Pre-Whirl", by Wallace, Whitfield and Atkey. It is also described in U.S. Pat. No. 5,025,629 to Woollenweber, June 1991.

SUMMARY OF THE INVENTION

In order to aid in the understanding of this invention, it can be stated in essentially summary form that it is directed to a motor-assisted variable geometry turbocharging system. The variable geometry is provided by the exhaust gas flow control configuration into the exhaust gas turbine, and/or the air inlet flow control into the air compressor, together with a motor drive for the turbocharger rotating assembly to enhance performance of a turbocharged engine.

It is thus a purpose and advantage of this invention to provide a motor drive for the turbocharger rotating assembly to supply power into the turbocharger system, in addition to that which can be achieved by extracting power from the exhaust gas.

It is a further purpose and advantage of this invention to provide a motor for adding power to a turbocharger which also includes control of the air inlet to the turbo compressor by the use of pre-whirl vanes upstream of the compressor wheel to move the flow range of the compressor in coordination with the flow requirements of the engine.

It is a further purpose and advantage of this invention to supply external power to a turbocharger, which is driven by exhaust gas expansion, by including a motor to supply torque to aid in rotating the shaft in the air compressor direction, and to include such an assisting motor together with control of airflow into the turbo compressor to enhance engine performance.

It is a further purpose and advantage of this invention to provide a motor connected to a turbo compressor rotating assembly, and control the motor in addition to controlling exhaust gas flow to the turbine and/or airflow into the turbocharger compressor to enhance engine performance.

It is a further purpose and advantage of this invention to provide an electric motor, mounted within the turbocharger central housing, so that the above-described purposes and advantages can be attained with minimum space utilization and as an item of original equipment for the engine manufacturer.

The features of the present invention which are believed to be novel are set forth with particularity in the appended claims. The present invention, both as to its organization aid manner of operation, together with further objects and advantages thereof, may be best understood by reference to the following description, taken in conjunction with the accompanying drawings.

DESCRIPTION OF THE PREFERRED EMBODIMENTS

To improve engine and vehicle response to opening of the throttle, an external power source is needed to operate the turbocharger at higher speed at engine idle in order to provide increased boost levels in the engine intake system in preparation for quick acceleration. This can be an electric motor, a hydraulic motor, a pneumatic motor, or the like, particularly a motor which can have its power output controlled. A preferred example and the example given below of an external power source is an electric motor that engages the turbocharger rotor at engine idle and increases the idle speed of rotation of the rotating assembly.

Having higher boost pressure available at engine idle speed than the boost pressure the turbocharger can provide from exhaust gas energy alone, allows fuel to be injected into the engine cylinders sooner during acceleration and reduces smoke and emissions during the transient period. The engine is able to produce more output torque during transients, and the higher boost pressure during acceleration should eliminate the need for fuel limiting devices, such as an aneroid control or fuel pump rack limiters.

The electric motor, coupled to the turbocharger rotor, can be energized before the engine is stared. Then, during cranking of the engine, a positive differential pressure will exist across the engine from intake manifold to exhaust manifold. In the case of a two-cycle engine, a positive differential is necessary for scavenging the cylinder during cranking. Therefore, if a two-cycle engine is turbocharged with an electric motor assist, the need for a gear-driven blower to provide the scavenge differential pressure needed for starting is eliminated.

Figure 1:
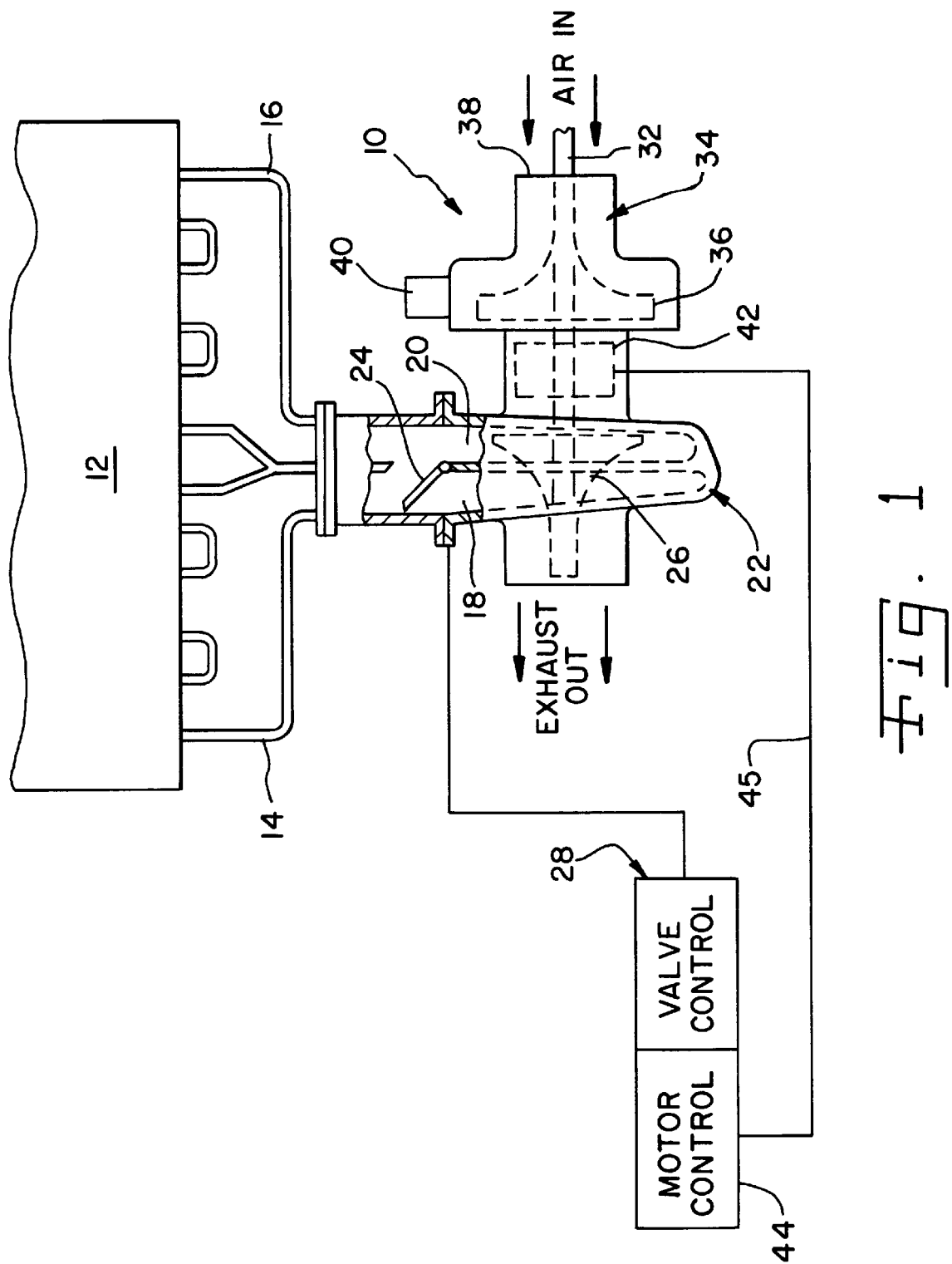
FIG. 1 is a schematic view of a turbocharging system which has a motor to add power to the turbocharger rotor, and has control of exhaust gas flow into a two-volute turbo expander.

The motor-assisted variable geometry turbocharging system of this invention is generally indicated at 10 in FIG. 1. Diesel engine 12 has two exhaust manifolds 14 and 16, which are separately ducted to the two volutes 18 and 20 of exhaust gas turbine 22. Valve 24 controls whether or not exhaust gas is delivered to one or both volutes. When exhaust gas volume is low, delivery of all exhaust gas to one volute provides a higher exhaust gas pressure, which delivers more power to the exhaust gas turbine rotor 26. Valve 24 is controlled by valve controller 28.

The exhaust gas turbine rotor 26 is mounted on turbocharger shaft 32 which, in turn, drives turbo compressor 34. The turbo compressor has a compressor rotor 36 therein so that, when rotated, air is drawn into inlet 38 and is delivered through outlet 40 to the engine intake system.

This structure is generally seen in Woollenweber U.S. Pat. No. 5,025,629, the entire disclosure of which is incorporated herein by this reference, see FIG. 9 thereof. For the reasons discussed above, and in addition to the variable geometry discussed in that patent, there are problems in delivering enough combustion air to the engine 12, particularly at low exhaust gas rates. For this reason, motor 42 is mounted to assist the turbocharger rotating assembly. The motor 42 may be an electric motor, a pneumatic motor, a hydraulic motor, or other type of motor. Preferably, however, motor 42 is an electric motor, with its rotor attached to the turbocharger rotating assembly, and its stator mounted in the interior of the turbocharger housing, with electric control line 45 supplying the appropriate motor control signals from motor control 44. When the engine is operating at low speed and there is an engine demand for more power and more speed, the valve 24 is in the single-volute, diverted position, and the motor 42 is energized to add power to the turbocharger. As the exhaust gas volume goes up, the valve can be switched to the neutral, double-volute position and, when exhaust gas is fully adequate to supply the entire power demand of the turbo compressor, no power need be supplied to the motor 42. If the motor 42 is configured so that it cannot be rotated as fast as the top speeds of the shaft 32, the motor 42 can be de-energized via control line 45. Thus, power is supplied to the motor 42 and the valve 24 is appropriately controlled for optimum turbocharger operating conditions under the engine speed and demand requirements.

Figure 2:
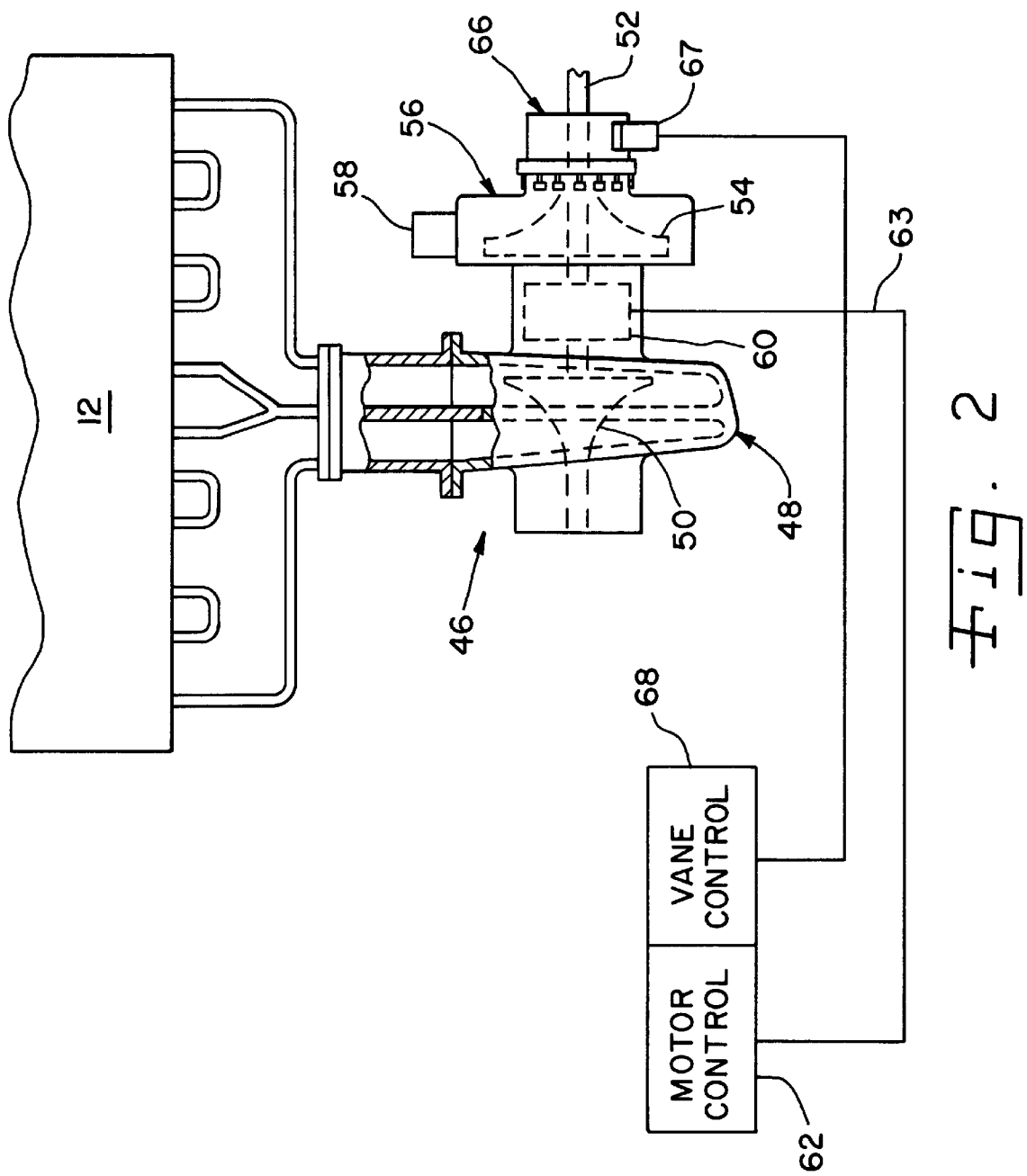
FIG. 2 is a schematic view of a turbocharging system which has a motor to add power to the turbocharger rotor, and has control of the airflow into the compressor.

FIG. 2 illustrates a similar turbocharging system 46 for a diesel engine. Turbocharging system 46 has an exhaust gas turbo expander rotor 50 mounted on turbocharger shaft 52. Compressor rotor 54 is driven by the shaft 52 and is mounted in compressor housing 56. Air is delivered from outlet 58 to the air inlet of the engine. Electric motor 60 is controlled by a motor controller 62 via line 63. Inlet 66 of the turbocharger has adjustable vanes, such as at 67 therein, which provide pre-whirl to the air inlet stream. As discussed in the references above, this pre-whirl adjusts the compressor performance. The pre-whirl can be adjusted by appropriate movement of the vanes, which causes the pre-whirl to adjust compressor performance. The vane control 68 thus provides variable geometry in the turbo compressor. Both the vane control and the motor control are individually adjusted to provide optimum turbocharging performance under the particular engine operating parameters and performance demands. The adjustment of turbo compressor conditions by control of input pre-whirl is discussed in the above-referenced publication.

Figure 3:
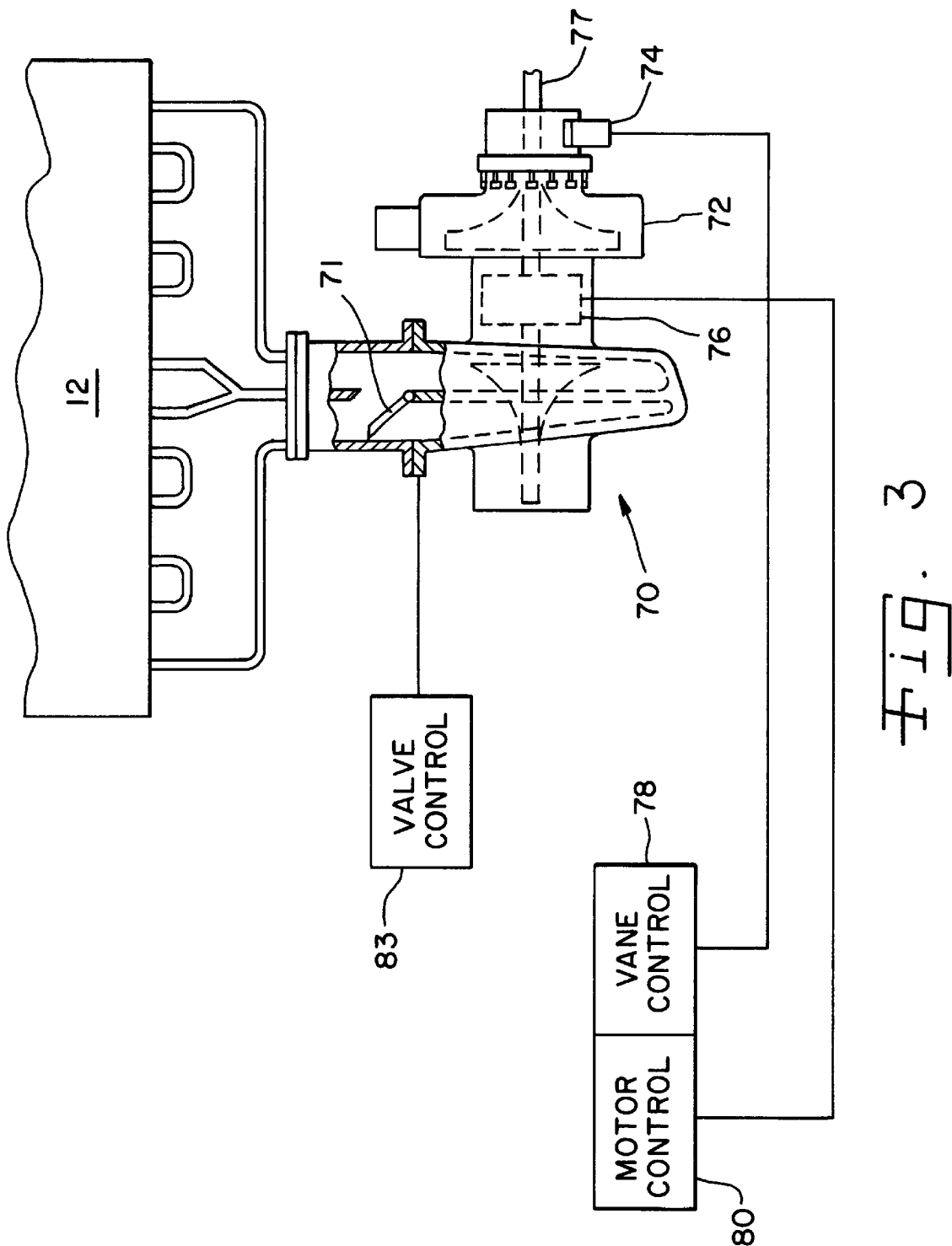
FIG. 3 is a schematic view of a turbocharging system, wherein the turbocharger has a motor to add power to the rotor, has control of exhaust gas flow into a two-volute turbo expander, and has control of airflow into the compressor.

FIG. 3 shows a turbocharging system 70 similar to the system shown in FIGS. 1 and 2. The turbocharging system 70 has a dual volute exhaust gas expander with the diverter valve 71, which diverts all exhaust gas flow from the split manifold of the engine to one volute for higher performance at low exhaust gas flow rates, as previously described. Furthermore, the compressor 72 has a pre-whirl control 74 at the air inlet to the compressor 72. Additionally, motor 76 is directly connected to the turbocharger rotating assembly.

The pre-whirl vane control 78 and the motor control 80, respectively, control the pre-whirl vanes in response to an engine speed signal, and the motor 76 is independently controlled to provide additional boost during engine acceleration. Diverter valve 71 is also controlled by valve control 83 in response to an engine speed signal so that all exhaust gas is diverted to one volute below a pre-determined engine speed.

Figure 4:
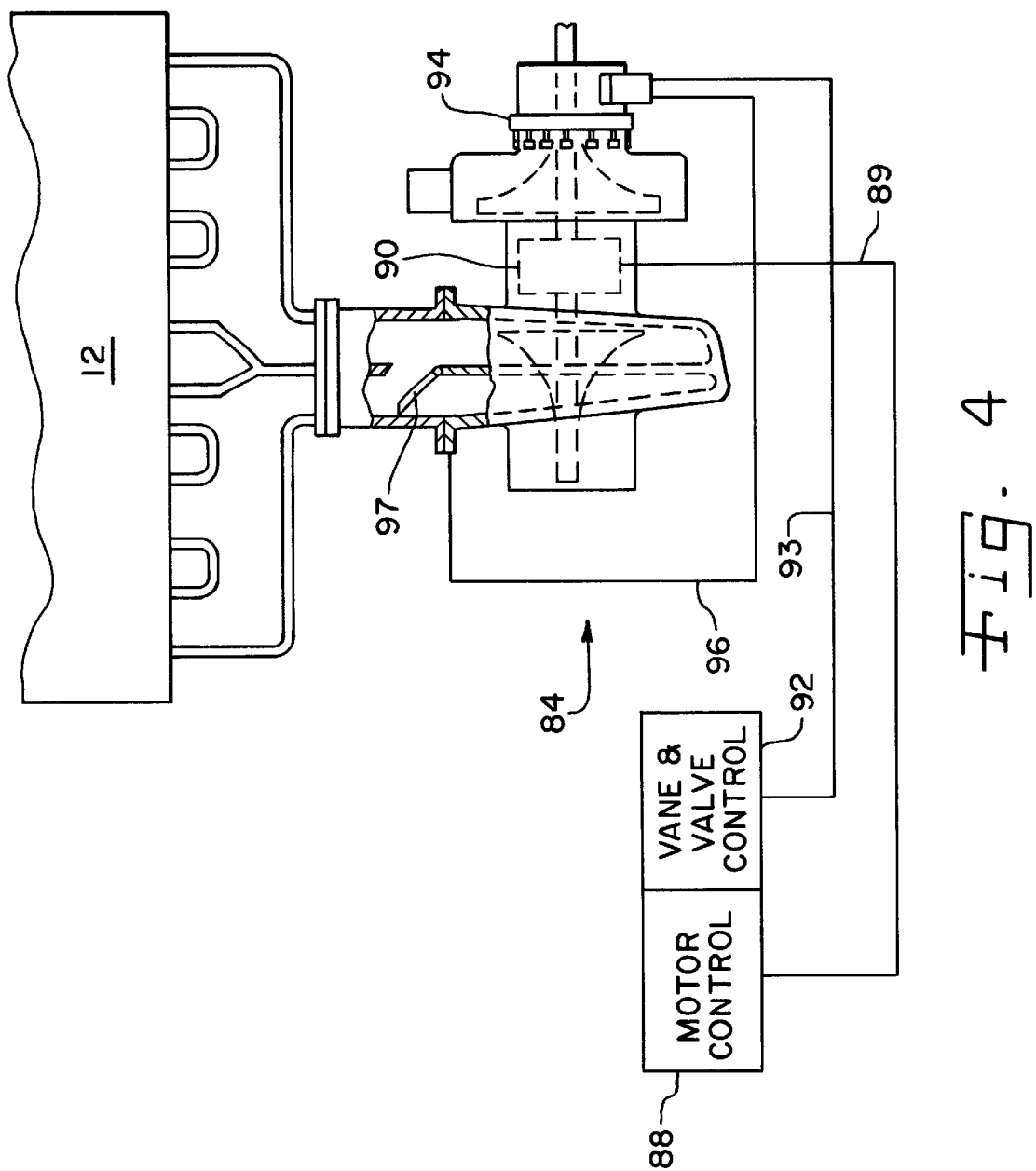
FIG. 4 is a schematic system similar to FIG. 3, but the exhaust gas flow into the turbo expander is controlled simultaneously with the control of airflow to the compressor.

FIG. 4 shows a system 84 which is structurally much like the system of FIG. 3. Coordinated therewith, and cooperating therewith, controller 92 controls through line 93 both the vanes 94 which control the pre-whirl and, through line 96, controls diverter valve 97. Since the pre-whirl control also controls the diverter valve, the two functions are coordinated. The control of the motor 90 remains independent of the control of the pre-whirl vanes and the diverter valve and is controlled by motor control 88 through line 89.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A motor-assisted variable geometry turbocharging system for an internal combustion engine, comprising:
   a turbine driven by exhaust gas from said internal combustion engine;
   a compressor for drawing air into a compressor air inlet and delivering air under pressure to the internal combustion engine, said compressor and turbine being connected together to rotate together;
   air inlet control vanes at said compressor air inlet for providing compressor inlet pre-whirl, said vanes being variable to control the amount of pre-whirl;
   means for controlling said vanes;
   a motor connected to rotate and supply power to said compressor; and
   means to control said motor,
   wherein said means to control said motor supplies power to rotate said motor upon start-up of said engine to assist said turbine in rotating said compressor at low exhaust gas flow rates and said means for controlling said vanes operates said air inlet control vanes to provide positive pre-whirl at the compressor inlet at engine idle speeds, and wherein upon an engine acceleration demand signal said means to control said motor supplies increased power to said motor to accelerate said compressor, said means for controlling said vanes operating said air inlet control vanes to provide negative pre-whirl at said compressor inlet at high engine speeds.

2. The turbocharging system of claim 1, including a turbocharger shaft, said turbine and said compressor being mounted on said turbocharger shaft, said motor being an electric motor having a rotor at a location between said compressor and said compressor.

3. The motor-assisted variable geometry turbocharging system of claim 1, wherein said means to control said motor removes power from said motor at high engine speeds.

4. An engine turbocharging system, comprising
   a turbocharger having a gas turbine with a gas inlet for connection to receive a flow of gas and a turbine wheel driven by said flow of gas and connected to drive a rotatable shaft, and having further a compressor with a gas inlet and a compressor wheel driven by said rotatable shaft to compress gas entering said gas inlet;
   a motor connected to rotate said rotatable shaft;
   means for controlling energization for said motor; and
   gas control means connected with said turbocharger, said gas control means comprising an inlet gas control for the gas inlet of the compressor,
   said means for controlling energization for said motor and gas control means being operable to rotate said motor in assistance of said turbine upon engine start-up and to accelerate said compressor in response to a demand for engine acceleration, said gas control means operating the inlet gas control to provide negative pre-whirl of the gas entering the gas inlet of the compressor as said engine reaches high engine speeds.

5. The engine turbocharging system of claim 4, wherein said means for controlling energization for said motor removes power from said motor at high engine speeds.

6. The engine turbocharging system of claim 4, wherein said gas control means operates the inlet gas control to provide positive pre-whirl upon engine start-up.

7. An engine turbocharging system, comprising
   a turbocharger having an exhaust gas inlet for connection to receive a flow of engine exhaust gas, a turbine wheel driven by said flow of engine exhaust gas, an electric motor, said turbine wheel and electric motor being connected to drive a rotatable shaft, and a compressor with an air inlet and a compressor wheel driven by said rotatable shaft to compress air entering said air inlet, said compressor having air inlet control vanes at its air inlet;

means for controlling energization for said motor; and means for controlling said air inlet control vanes, said means for controlling energization for said motor energizing said electric motor to assist said turbine in driving said compressor at engine start-up and with increased energization upon engine acceleration demand, said means for controlling said air inlet control vanes controlling said air inlet control vanes to provide negative air pre-whirl at the air inlet of the compressor at high engine speeds.

8. The engine turbocharging system of claim 7, wherein said means for controlling energization for said motor ceases supplying energy to said electric motor at high engine speeds.

9. The engine turbocharging system of claim 7, wherein said air inlet control vanes provide positive air pre-whirl at engine start-up and in the absence of engine acceleration demand.

* * * * *